US008830181B1

(12) United States Patent
Clark et al.

(10) Patent No.: US 8,830,181 B1
(45) Date of Patent: Sep. 9, 2014

(54) GESTURE RECOGNITION SYSTEM FOR A TOUCH-SENSING SURFACE

(75) Inventors: Paul Clark, Belleuve, WA (US); Edward Grivna, Brooklyn Park, MN (US); Tony Park, Everett, WA (US); Patrick Prendergast, Clinton, WA (US); Gabe Rowe, Seattle, WA (US); Ryan Seguine, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1280 days.

(21) Appl. No.: 12/476,240

(22) Filed: Jun. 1, 2009

Related U.S. Application Data

(60) Provisional application No. 61/057,867, filed on Jun. 1, 2008.

(51) Int. Cl.
*G09G 5/00* (2006.01)
(52) U.S. Cl.
USPC .......................................... 345/173; 715/863
(58) Field of Classification Search
CPC ................. G06F 3/041; G06F 3/0416; G06F 2203/04104; G06F 3/0488; G06F 3/04883
USPC .................................. 345/156–179; 715/863
See application file for complete search history.

(56) References Cited

U.S. PATENT DOCUMENTS

| 2002/0097229 | A1* | 7/2002 | Rose et al. | 345/173 |
|---|---|---|---|---|
| 2006/0125803 | A1* | 6/2006 | Westerman et al. | 345/173 |
| 2006/0274046 | A1* | 12/2006 | Hillis et al. | 345/173 |
| 2008/0309632 | A1* | 12/2008 | Westerman et al. | 345/173 |
| 2008/0316183 | A1 | 12/2008 | Westerman et al. | |
| 2009/0051660 | A1* | 2/2009 | Feland et al. | 345/173 |
| 2009/0284478 | A1 | 11/2009 | De La et al. | |
| 2009/0289902 | A1* | 11/2009 | Carlvik et al. | 345/173 |
| 2010/0149115 | A1 | 6/2010 | Park et al. | |

OTHER PUBLICATIONS

USPTO Final Rejection for U.S. Appl. No. 13/449,179 dated Sep. 30, 2013; 12 pages.
USPTO Non-Final Rejection for U.S. Appl. No. 12/337,411 dated Nov. 23, 2011; 12 pages.
USPTO Non-Final Rejection for U.S. Appl. No. 13/449,179 dated Mar. 29, 2013; 10 pages.
USPTO Notice of Allowance for U.S. Appl. No. 12/337,411 dated Mar. 22, 2012; 9 pages.
USPTO Notice of Allowance for U.S. Appl. No. 13/449,179 dated Nov. 8, 2013; 11 pages.

* cited by examiner

*Primary Examiner* — Regina Liang

(57) ABSTRACT

An apparatus and method for identifying gestures performed on a touch-sensing surface. In one embodiment, a gesture recognition unit processes an input signal to determine input metrics associated with contacts at the touch-sensing surface. The gesture recognition unit identifies a gesture based on comparing at least one of the input metrics with a threshold value associated with the gesture.

18 Claims, 14 Drawing Sheets

GESTURE RECOGNITION SYSTEM FOR A TOUCH-SENSING SURFACE

RELATED APPLICATIONS

This application claims the benefit of U.S. Provisional Application No. 61/057,867, filed on Jun. 1, 2008.

TECHNICAL FIELD

This disclosure relates to the field of user interface devices and, in particular, to gesture recognition on devices that have a touch-sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as fingers. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a touch, by using a finger to press the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
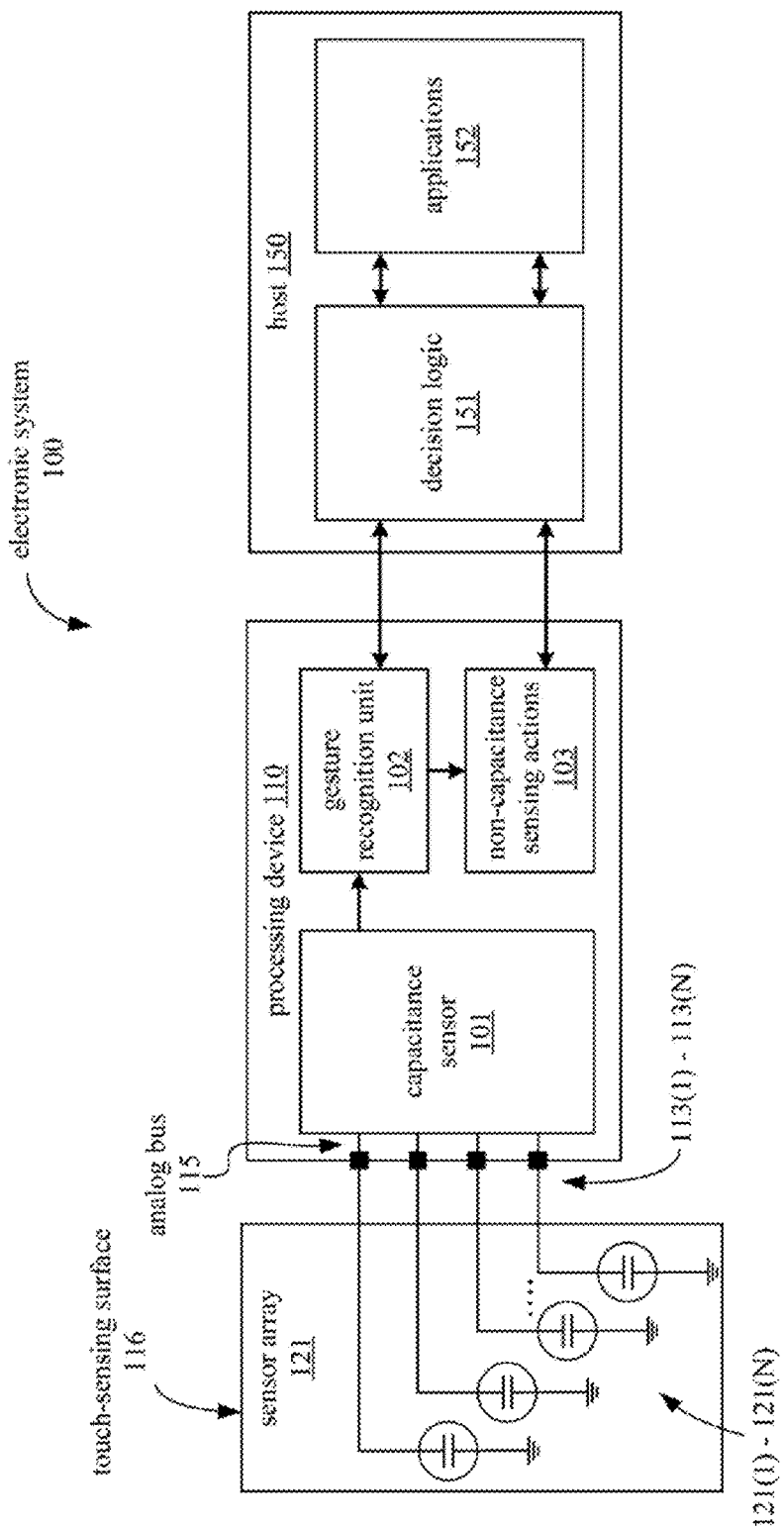
FIG. 1 illustrates a block diagram of one embodiment of an electronic system having a processing device for recognizing a gesture.

Described herein is an apparatus and method for recognizing gestures input on a touch sensor, such as a touch-sensing surface. In one embodiment, the gestures are performed using single or multiple contacts on the touch-sensing surface, wherein each contact indicates physical or proximate contact between a users finger, hand, palm, or other object detected by the specific touch sensor. In one embodiment, a gesture recognition system identifies gestures based on characteristics such as the duration of the contact, start and end times of the contact, acceleration of motion of the contact, direction of motion of the contact, or a path of motion of the contact. In one embodiment, the apparatus applies a segmentation scheme to determine the path of the contact.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format. Thus, the specific details set forth are merely examples. Particular implementations may vary from these exemplary details and still be contemplated to be within the spirit and scope of the present invention.

In one embodiment, a gesture recognition unit receives an input signal from a touch sensor. For example, the touch sensor may be a touch-sensing surface that includes an array of capacitive sensors arranged in a grid. Such a touch-sensing surface may generate a signal containing information about the contacts present at or upon the touch-sensing array, such as the presence of a conductive object touching or in close proximity to the surface of the touch-sensing array. Said signal, as presented to the gesture recognition unit, may also include location information for each of the contacts.

In one embodiment, the gesture recognition unit receives and processes the input signal to determine a set of input metrics, which may include information about each of the contacts at the touch sensor. For example, the input metrics may include durations, locations, directions of movement, paths, velocities, accelerations, and numbers of contacts. In one embodiment, where the input metrics include a direction of motion of a contact, the gesture recognition unit determines a direction of motion between a first location of a contact and a second location of a contact. The first location of the contact may be, for example, a location of an initial touch of a detected object, while the second location may be a location where said object is removed from the touch sensor. Alternatively, in embodiments where the location of the contact is sampled over time, the first location may be the location of the contact at the time of a first sample, while the second location may be the location of the contact at the time of a subsequent sample.

In one embodiment, the gesture recognition unit determines a direction vector between the first location and the second location of the contact. The gesture recognition unit may then apply a segmentation scheme to classify the direction of movement of the contact. In one embodiment, a segment is a range of directions relative to the first location of the contact. For example, a possible segmentation scheme may divide the possible 360 degrees of direction around a location into four equal segments, with each segment covering a range of 90 degrees. In this example, the gesture recognition unit would determine the segment corresponding to the direction vector according to the range of direction in which the direction vector falls.

In one embodiment, a sequence of segments can be determined in this manner for a set of locations of a single contact. For example, these locations may be acquired by sampling the location of the contact over time. In this example, a sequence of segments may correspond to the sequence of direction vectors between each of the sampled locations.

In one embodiment, the gesture recognition unit can derive a segment sequence from a set of locations of a moving contact, and compare the derived segment sequence with a predefined segment sequence associated with a gesture. In one embodiment, the gesture recognition unit identifies a gesture and executes instructions associated with the gesture if the segment sequences match.

In one embodiment, the gesture recognition unit identifies a gesture based on whether multiple contacts overlap in time. This temporal overlap may occur between a first and a second contact, for example, if the touch sensor detects both the first contact and the second contact at the same time. In contrast, no temporal overlap occurs if the first contact is detected as lifted before the second contact begins.

In one embodiment, the gesture recognition unit identifies a gesture based on a velocity or an acceleration of a contact at the touch sensor. For example, for a touch sensor that samples the location of a contact at regular intervals, velocity of the contact can be determined by the distance between sampled locations of the contact. Likewise, a change in acceleration may be determined by comparing the velocity between consecutive sampled locations. In one embodiment, a gesture may be identified based on whether the detected acceleration of the contact exceeds a threshold acceleration or falls within a range of acceleration values.

FIG. 1 illustrates a block diagram of one embodiment of an electronic system 100 that includes a gesture recognition unit 102 that is configured to identify gestures input at a touch-sensing surface 116. The electronic device 100 includes a touch-sensing surface 116 (e.g., a touchscreen, or a touch pad) coupled to a processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via an analog bus 115 transporting multiple signals. In this embodiment, each sensor element 121(1)-121(N) is represented as a capacitor. The capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over a certain threshold.

In one embodiment, the processing device 110 further includes a gesture recognition unit 102. Operations of the gesture recognition unit 102 may be implemented in firmware; alternatively, it may be implemented in hardware or software. The gesture recognition unit 102 stores parameters that define the location (e.g., XY coordinates) and granularity (e.g., a half, a quarter, ⅛, or any percentage with respect to the size of the touch-sensing surface 116) of each logical zone (defined herein), and a set of rules that define the gestures to be recognized. The gesture recognition unit 102 receives signals from the capacitance sensor 101, and determines the state of the sensor array 121, such as whether an object (e.g., a finger) is detected on or in proximity to the sensor array 121 (e.g., determining the presence of the object), where the object is detected on the sensor array (e.g., determining one or more logical zones in which the object is detected), tracking the motion of the object (e.g., determining a temporal sequence of logical zones of the touch-sensing surface in which the movement of the object is detected), or or other information related to an object detected at the touch sensor.

In another embodiment, instead of performing the operations of the gesture recognition unit 102 in the processing device 110, the processing device 101 may send the raw data or partially-processed data to the host 150. The host 150, as illustrated in FIG. 1, may include decision logic 151 that performs some or all of the operations of the gesture recognition unit 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the gesture recognition unit 102 may be implemented in the decision logic 151, the applications 152, or in other hardware, software, and/or firmware external to the processing device 110. In some other embodiments, the processing device 110 is the host 150.

In another embodiment, the processing device 110 may also include a non-capacitance sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
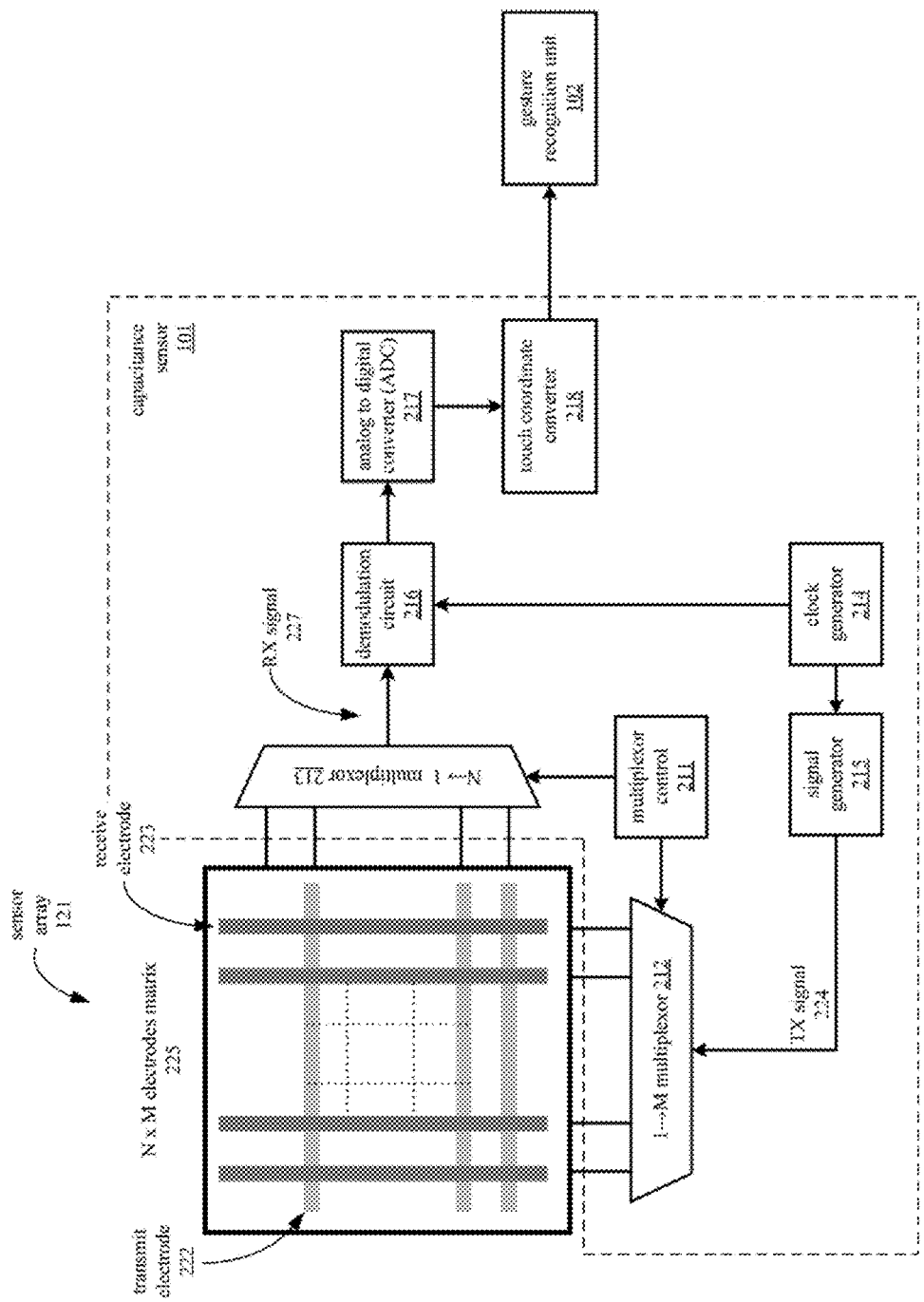
FIG. 2 illustrates a block diagram of one embodiment of a device for detecting an input and a location of the input on a touch sensor surface.

FIG. 2 is a block diagram illustrating one embodiment of a capacitive touch sensor array 121 and a capacitance sensor 101 that converts measured capacitances to coordinates. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through multiplexers 212 and 213.

Capacitance sensor 101 includes multiplexer control 211, multiplexers 212 and 213, clock generator 214, signal generator 215, demodulation circuit 216, and analog to digital converter (ADC) 217. ADC 217 is further coupled with touch coordinate converter 218. Touch coordinate converter 218 outputs a signal to gesture recognition unit 102.

The transmit and receive electrodes in the electrode matrix 225 may be arranged so that each of the transmit electrodes overlap and cross each of the receive electrodes such as to form an intersection, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 intersect.

Clock generator 214 supplies a dock signal to signal generator 215, which produces a TX signal 224 to be supplied to the transmit electrodes of touch sensor 220. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with multiplexer 212, which allows the TX signal 224 to be applied to any of the M transmit electrodes of touch sensor 220. In one embodiment, multiplexer control 211 controls multiplexer 212 so that the TX signal 224 is applied to each transmit electrode in a controlled sequence. Multiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through multiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The capacitance associated with each intersection between a TX electrode and an RX electrode can be sensed by selecting every available combination of TX electrode and an RX electrode using multiplexers 212 and 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between the two electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225 the locations of one or more contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current waveform 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to gesture recognition unit 102. Gesture recognition unit 102 processes the signal to identify which, if any, of a number of gestures has been performed at the touch sensor array 121.

In one embodiment, the sensor array 121 can be configured to detect multiple touches so that multi-touch gestures can be recognized. In an alternate embodiment the sensor array 121 may also be configured to resolve the locations of said detected multiple touches so that more complex multi-touch gestures may also be recognized.

One technique for multi-touch detection uses a two-axis implementation: one axis to support rows and another axis to support columns. Additional axes, such as a diagonal axis, implemented on the surface using additional layers, can allow resolution of additional touches.

Another method for multi-touch detection and gesture recognition has the user insert a time delay between the first and subsequent touches on the touch-sensing surface.

Another method for multi-touch detection and gesture recognition is to divide a touch-sensing surface into logic zones and track a temporal sequence of the activated logic zones on the touch-sensing surface. This method determines the approximate location of the touches (e.g., which local zones are activated by the touches) and then tracks changes in the activated zones. As a result, this method recognizes a multi-touch gesture when one or more touches of the multi-touch gesture transitions from one zone to another.

In one embodiment, the detection of gestures is based on characteristics of the input at a touch sensor, such as the presence of a contact (such as a touch of a finger or other conductive object), a location of the contact on the touch sensor, and the start and end times of a contact. In embodiments where multi-touch gestures are supported, gestures may be identified based on the presence, location, and start and end times of each of a number of contacts at the touch sensor. In one embodiment, this information is communicated to the gesture recognition unit 102 via an input signal generated by the capacitance sensor 101.

In one embodiment, the gesture recognition unit 102 processes the input signal from the capacitance sensor 101 to determine a set of input metrics. These input metrics may include, for example, a duration of a contact, a direction of movement of a contact over time, a temporal overlap between two or more contacts, a velocity of a contact, an acceleration of a contact, paths of one or more contacts, a numbers of contacts present, or other information describing a motion, a location, or a presence of a contact present at a touch sensor.

Figure 3:
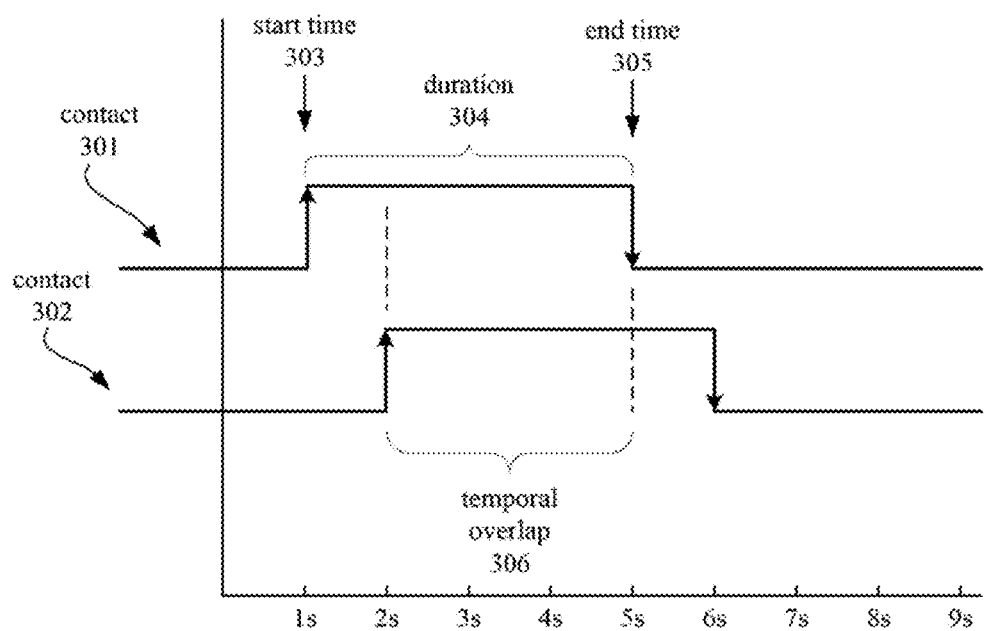
FIG. 3 illustrates a timing diagram of fingers, touches, or other materials contacting a touch sensor surface, according to one embodiment.

In one embodiment, the gesture recognition unit 102 calculates the duration of a contact based on the difference between the start and end times of the contact. With reference to FIG. 3, for example, a start time 303 of a contact 301 at time t=1s may correspond to a time at which a finger is touched to the sensor array 121, while an end time 305 of the contact at t=5s corresponds to the time at which the finger is lifted from the sensor array 121. In this example, the duration 304 of the contact caused by the finger touch is 4s, from the difference of 5s and 1s.

In one embodiment, the gesture recognition unit 102 calculates a temporal overlap 306 between two contacts 301 and 302 based on the start and end times of each contact. The temporal overlap 306 refers to the time during which any of the two or more contacts are simultaneously present. For example, the temporal overlap 306 is the time when both contacts 301 and 302 are present. In one embodiment, where contacts 301 and 302 correspond to finger touches, the temporal overlap 306 may correspond to the length of time during which both fingers are touching the touch-sensor array.

One embodiment of a gesture recognition system is configured to recognize a variety of gestures based on whether two or more contacts are or are not temporally overlapping. These gestures may include drumming gestures, walking gestures, motion and tap gestures, or cascade gestures, or any other gesture that is recognized based on two or more contacts being simultaneously present or temporally related at a touch sensor.

In one embodiment, a drumming gesture is detected when taps occur alternately at two or more locations on the touch sensor array 102. For example, a drumming gesture may be detected when two fingers are "drumming" or alternately tapping the touch sensor surface. The first finger causes several taps or short contacts at a first location while the second finger causes several taps or short contacts at a second location.

Figure 4A:
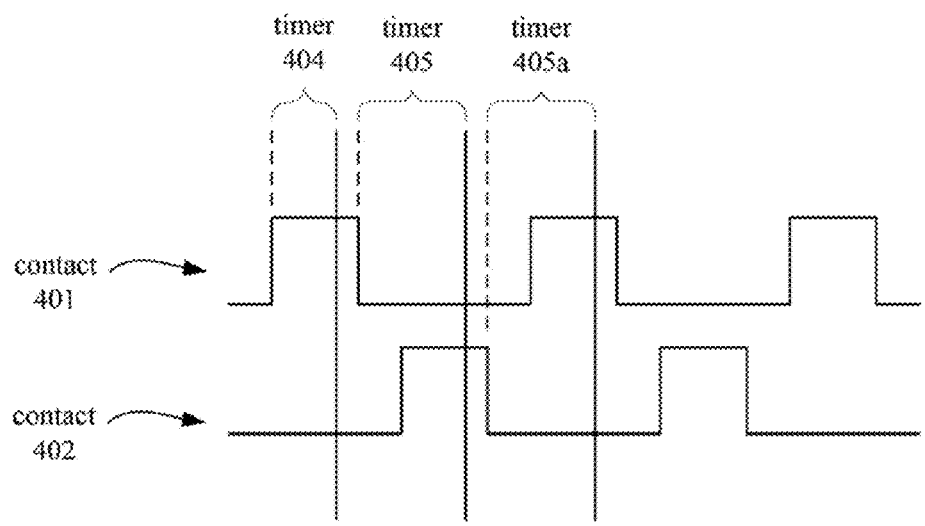
FIG. 4A illustrates a timing diagram of contacts performing a drumming gesture on a touch sensor surface, according to one embodiment.

FIG. 4A is a diagram illustrating the timing of contacts associated with a drumming gesture, according to one embodiment. With reference to FIG. 4A, a high level for contact 401 or contact 402 means that the respective contact is present at the surface of the touch sensor array 121.

Figure 4B:
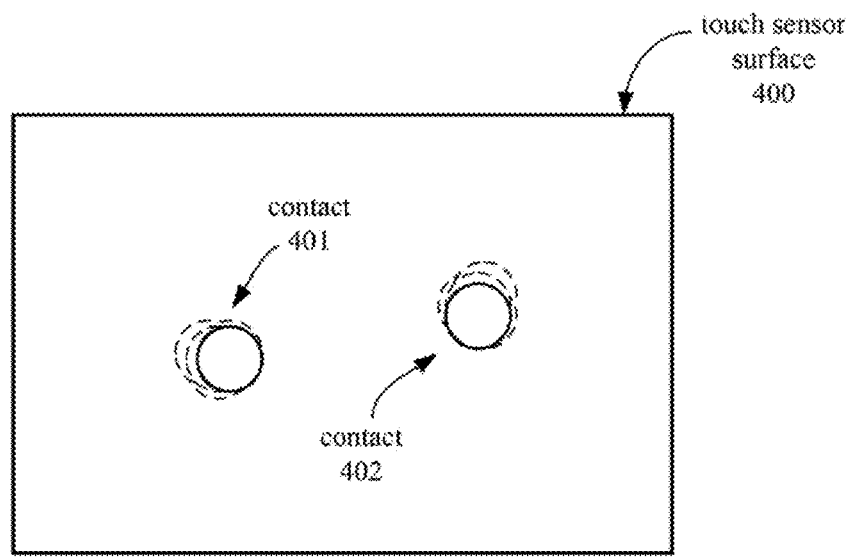
FIG. 4B illustrates possible locations of contacts performing a drumming gesture on a surface of a touch sensor, according to one embodiment.

FIG. 4B illustrates a surface of a touch sensor 400 showing possible touch locations for contacts 401 and 402, according to one embodiment.

At the start of contact 401, contact 401 is recognized by the gesture recognition unit 102 and timer 404 is started. If contact 401 remains on the touch sensor surface 400 for longer than the duration of timer 404, the gesture recognition unit registers a tap by contact 401. Note that the referenced timers 404, 405, and 405a and other timers referenced in this specification may all be the same physical timer, where running time values are captured and processed at or during each event, or may be any other combination of real and virtual timers.

When contact 401 is released, a second timer, timer 405, is initialized. If contact 402 is detected in a substantially different location from contact 401, after of contact 401 ends, and before timer 405 expires, the drumming gesture is continued.

When contact 402 is detected by the gesture recognition unit, timer 405 is restarted as timer 405a. If contact 401 is detected within a threshold distance of the same location as it was last detected, after contact 402 is released and before timer 405a expires, then a drumming gesture is recognized.

In one embodiment, the duration of the drumming gesture is maintained as long as non-overlapping and repetitive touches are repeated. Note that contacts 401 and 402 are temporally non-overlapping, in that they do not simultaneously contact the touch sensor surface 400.

In one embodiment, the drumming need not continue at the original locations, but may move around the surface of the touch sensor.

Figure 5A:
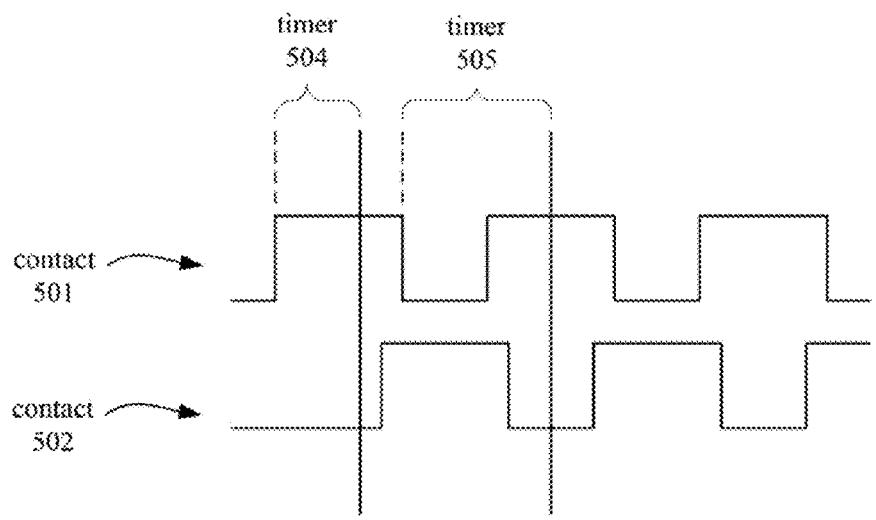
FIG. 5A illustrates a timing diagram of contacts performing a walking gesture on a touch sensor surface, according to one embodiment.

In contrast with drumming gestures, walk gestures are characterized by two or more alternating contacts that are temporally overlapping. FIG. 5A is a diagram that illustrates the timing of two contacts effecting a walk gesture, according to one embodiment. With reference to FIG. 5A, a high level for contact 501 or contact 502 means that the respective contact is present at the surface of the touch sensor array 121.

Figure 5B:
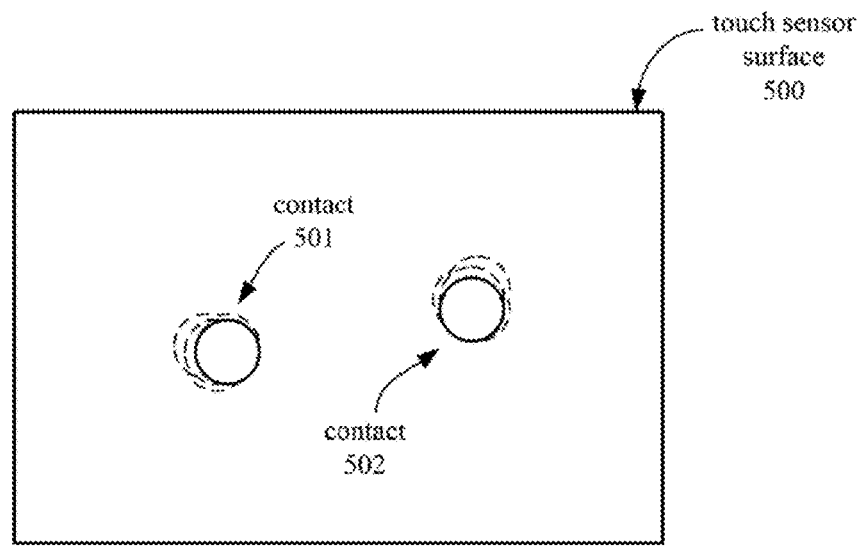
FIG. 5B illustrates possible locations of contacts performing a walking gesture on a touch sensor surface, according to one embodiment.

FIG. 5B illustrates a surface of a touch sensor 500 showing possible touch locations for contacts 501 and 502 while performing a walking gesture, according to one embodiment.

At the beginning of contact 501, contact 501 is recognized by the gesture recognition unit 102 and timer 504 is started. If contact 501 remains on the touch sensor surface 500 for longer than timer 504, the gesture recognition unit 102 registers a touch by contact 501. If contact 502 is detected more than a minimum distance away from contact 501 before release of contact 501, then the walk gesture continues. When contact 501 is released, a second timer 505 is started. If contact 501 is re-established with the sensing array 121 before the expiration of timer 505 while contact 502 remains present, a walk gesture is recognized. The walk gesture is maintained as long as overlapping touches continue to be repeated.

In one embodiment, the walking gesture need not continue at the original locations, but may move around the surface of the touch sensor.

Figure 6A:
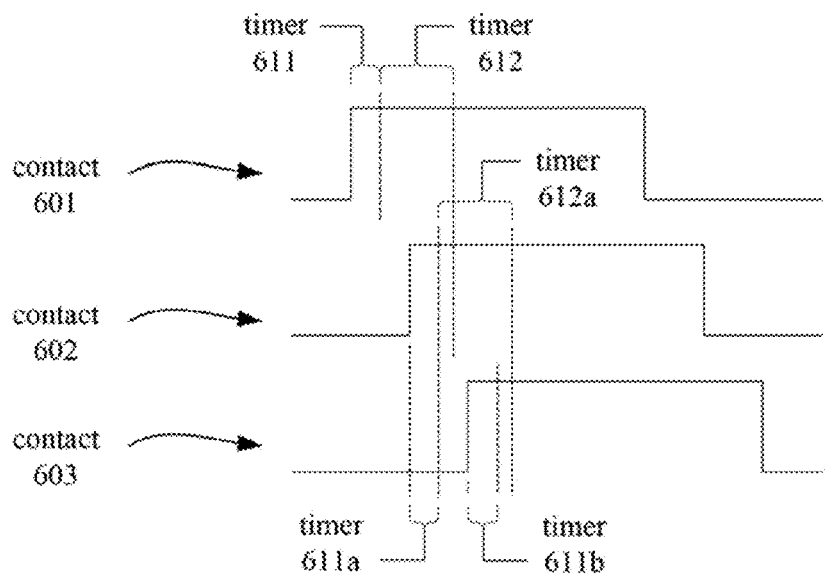
FIG. 6A illustrates a timing diagram of contacts performing a cascade gesture on a touch sensor surface, according to one embodiment.

A cascade gesture is another type of gesture that is characterized by two or more contacts that are temporally overlapping. FIG. 6A is a diagram that illustrates the timing of three contacts effecting a cascade gesture, according to one embodiment. With reference to FIG. 6A, a high level for contacts 601, 602, or 603 means that the respective contact is present at the surface of the touch sensor array 121.

Figure 6B:
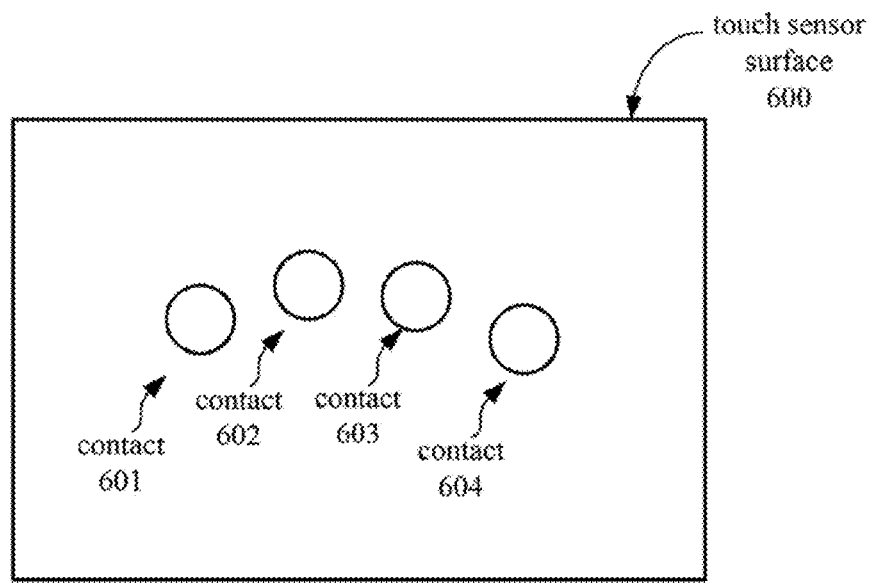
FIG. 6B illustrates possible locations of contacts performing a cascade gesture on a touch sensor surface, according to one embodiment.

FIG. 6B illustrates a surface of a touch sensor 600 showing possible touch locations for contacts 601 and 602, according to one embodiment.

At the start of contact 601, gesture recognition unit detects contact 601 and timer 611 is started. If contact 601 remains on the touch sensor surface 600 for longer than timer 611, gesture recognition unit 102 recognizes contact 601 as a touch.

When contact 601 is detected as a touch, timer 612 is started. If contact 602 is detected before timer 612 expires, the cascade gesture continues. For the cascade gesture to continue, the gesture recognition unit 102 also verifies that contact 601 remains in contact with the touch sensor surface 600 when contact 602 is detected. When contact 602 is detected, timers 611 and 612 are reset and restarted as timers 611a and 612a, respectively. Timers 611a and 612a may have the same durations as timers 611 and 612, respectively. If contact 602 remains on the touch sensor surface 600 for longer than timer 611a, gesture recognition unit 102 registers a touch.

If contacts 601 and 602 remain in contact with the touch sensor surface 600 when contact 603 is detected and contact 603 is detected before timer 612a expires, then the gesture recognition unit 102 continues recognizing the cascade gesture. Otherwise, a cascade gesture is not recognized. When contact 603 is detected, timer 611a is reset. Contact 603 must remain on the touch sensor surface 600 for longer than timer 611b to register as a touch. In one embodiment, the cascade gesture is identified when the duration of contact 603 exceeds timer 611b and is registered as a touch.

With reference to FIG. 6A, note that contacts 601, 602, and 603 are temporally overlapping. In one embodiment, the gesture recognition unit 102 identifies a cascade gesture based on whether or not this temporal overlap occurs.

The cascade gesture may also include additional contacts, such as contact 604 (not pictured in FIG. 6A) with similar timing as for contacts 601, 602, and 603. Cascade gestures may also invoke different functions based on the number of contacts used in the cascade. For example, a three-contact cascade may invoke a different function than a four-contact cascade. Cascade gestures may also invoke different functions based on the apparent direction of finger placement on the touch sensor surface. For example, the sequence of contact 601, 602, 603 and 604 contacting the touch sensor as left to right in FIG. 6B may be recognized differently from the sequence of 604, 603, 602, and 601 contacting the touch sensor as right to left.

In one embodiment, the gesture recognition unit 102 determines a direction of motion of one or more contacts at the touch sensor so that it can recognize gestures based on the direction of motion or path of one or more contacts. To determine a direction of motion for a contact at the touch sensor array 121, the gesture recognition unit 102 determines whether the contact has made any significant motion.

For example, if the initial contact and lift off of the contact are in substantially the same location, the gesture recognition unit 102 may treat the contact as not having moved. Contacts that begin and end at the same location in this manner may be treated as taps or clicks, and may be used to perform an action such as simulating a left mouse click or a menu or item selection in a graphical user interface (GUI).

One embodiment of a gesture recognition unit 102 distinguishes between taps and moving contacts by determining whether a contact has moved by more than an active distance between the beginning and the end of the contact, or between two other locations of the contact. In one embodiment, the gesture recognition unit 102 may periodically check to see whether the active distance has been exceeded by the motion of the contact.

Figure 7:
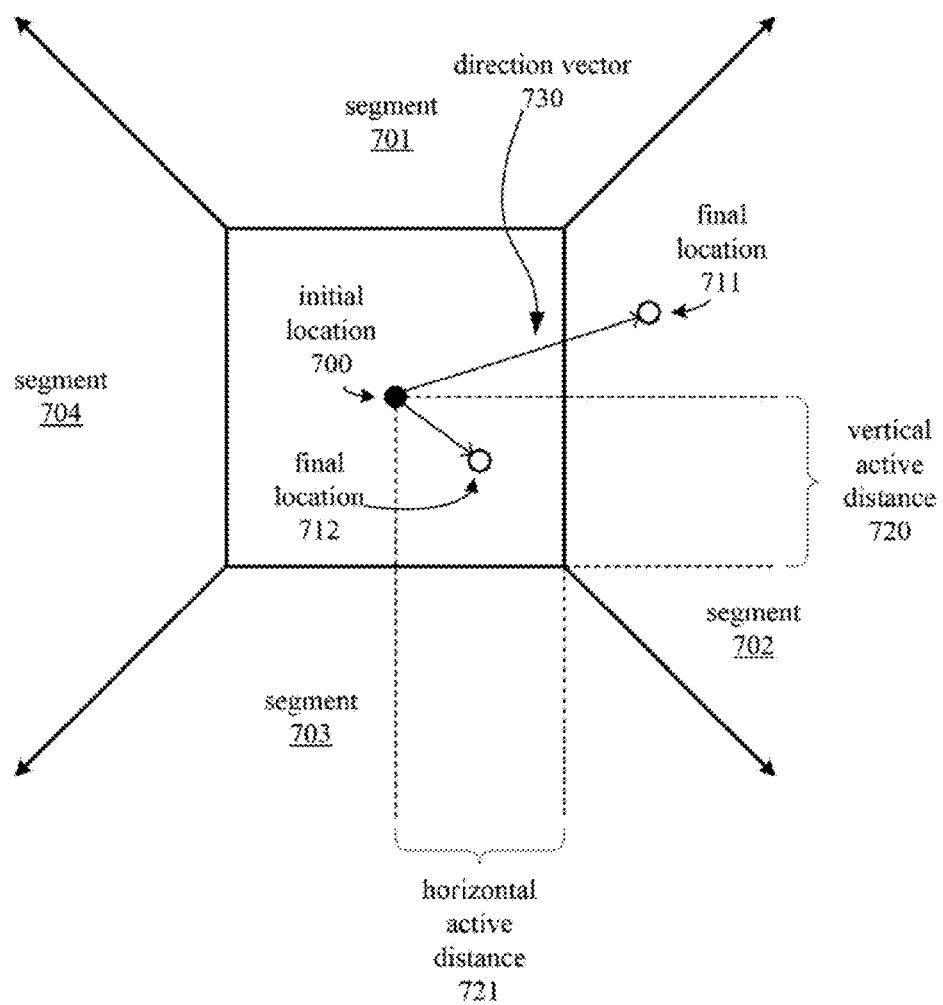
FIG. 7 illustrates active distances and segments around an initial contact location, according to one embodiment.

FIG. 7 illustrates active distances in a two-dimensional space around an initial touch 700 of a contact. Active distances 720 and 721 represent the distances that a contact must move relative to the initial location 700 so that the gesture recognition unit will detect the contact as having moved. If the contact moves less than the horizontal active distance 721 in the horizontal direction, and moves less than the vertical active distance 720 in the vertical direction, then the gesture recognition unit 102 will detect the contact as a tap or a touch at a single location. For example, if a contact begins at initial location 700 and ends at a final location 712, the motion of the contact does not exceed the active distances 720 and 721 in either the horizontal or vertical directions and will be detected as a tap or touch.

In one embodiment, the active distances may be set based on the signal to noise ratio (SNR) of the touch sensor output signal to prevent false detections of movement. For example, a system with a low SNR (corresponding to a high level of noise or very fast sensing) may have a larger set of active distances so that noise in the system is less likely to cause the gesture recognition unit 102 to erroneously detect that a contact is in motion.

In an alternative embodiment, the active distances are not associated with the horizontal and vertical distances, but may define a radius such that motion is detected if the contact moves outside the radius. In some embodiments, the active distance may change based on other factors, such as user settings or orientation of the touch sensor.

The gesture recognition unit 102 may further distinguish between a tap and a touch by comparing the duration of the contact with a maximum duration for a tap, or a minimum duration for a touch. For example, the gesture recognition unit may detect any non-moving contact with a duration of less than 500 milliseconds as a tap, rather than a touch.

In one embodiment, if the movement of a contact at the touch sensor array 121 exceeds the either the vertical active distance 720 or the horizontal active distance 721, the gesture recognition unit 102 detects the movement of the contact. For example, a contact beginning at initial location 700 and moving to final location 711 where it is released exceeds the horizontal active distance 721 and the motion of the contact is detected by the gesture recognition unit 102.

In one embodiment, a motion and tap gesture is only recognized if the duration of contact 802 is less than a maximum value. In one embodiment, a contact with such a duration, that is less than a maximum value, is classified as a tap rather than a touch.

In one embodiment, the gesture recognition unit 102 may recognize gestures based on a path of one or more contacts, where the path may be determined by applying a segmentation scheme. The gesture recognition unit 102 may apply the segmentation scheme in response to detecting motion of a contact. The segmentation scheme allows the gesture recognition unit 102 to determine a direction of motion of the contact. Referring back to FIG. 7, one embodiment of a segmentation scheme divides the radius around a location 700 on the touch sensor array 121 into several radial segments 701, 702, 703, and 704, where each segment covers 90 degrees of direction.

In one embodiment, a contact at the touch sensor array 121 may move from an initial location, such as touch location 700, to a final location, such as release location 711. The initial and final locations may also represent locations of the contact sampled over time, and are not necessarily locations of an initial touch or lift off of the contact.

If the motion of the contact between the initial and final location exceeds one of the active distances 720 or 721, the gesture recognition unit identifies one of the radial segments 701-704 within which the motion falls. For example, if the motion of the contact is greater than the active distance and is towards the right of the initial location 700, the corresponding segment is segment 702. If the motion is upwards from initial location 700, the corresponding segment is segment 701, and so on.

With reference to FIG. 7, if a contact begins at initial location 700 and moves to final location 711, the segment corresponding to the motion is segment 702. In one embodiment, segment 702 may be defined as an area within which the final location falls, or may alternatively be defined as a range of vectors or angles. For instance, the gesture recognition unit 102 may define a direction vector between the initial location 700 and the final location 711. The gesture recognition unit 102 identifies the segment 702 corresponding to direction vector 730 upon determining that direction vector 730 falls within a range of vectors associated with segment 702.

In alternative embodiments, a segmentation scheme may divide the area around the initial location 700 into fewer or more than four segments, or may divide the segments disproportionately.

Figure 8A:
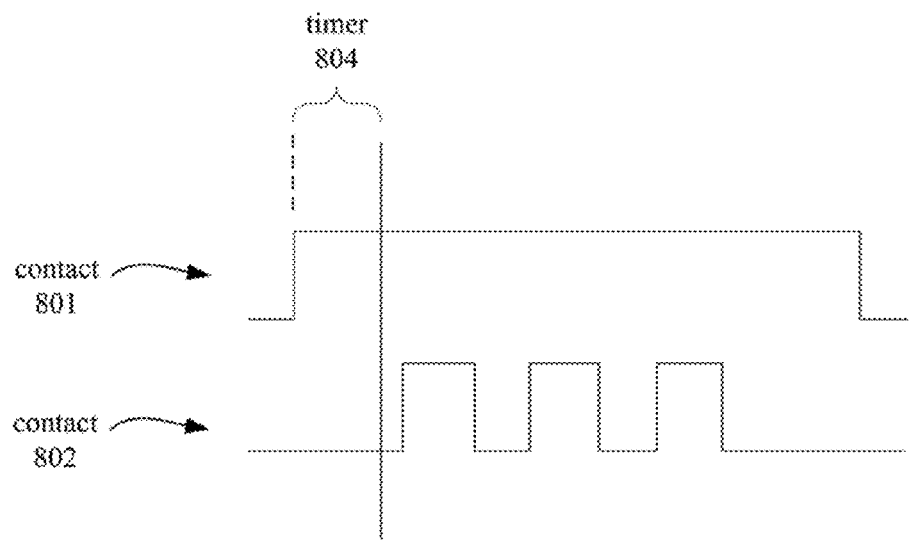
FIG. 8A illustrates a timing diagram of contacts performing a motion and tap gesture on a touch sensor surface, according to one embodiment.

A motion and tap gesture is a type of gesture that can be recognized based on whether a contact is in motion and whether two or more contacts are temporally overlapping. FIG. 8A is a diagram that illustrates the timing of two contacts effecting a motion and tap gesture. With reference to FIG. 8A, a high level for contact 801 or contact 802 means that the respective contact is present at the surface of the touch sensor array 121.

Figure 8B:
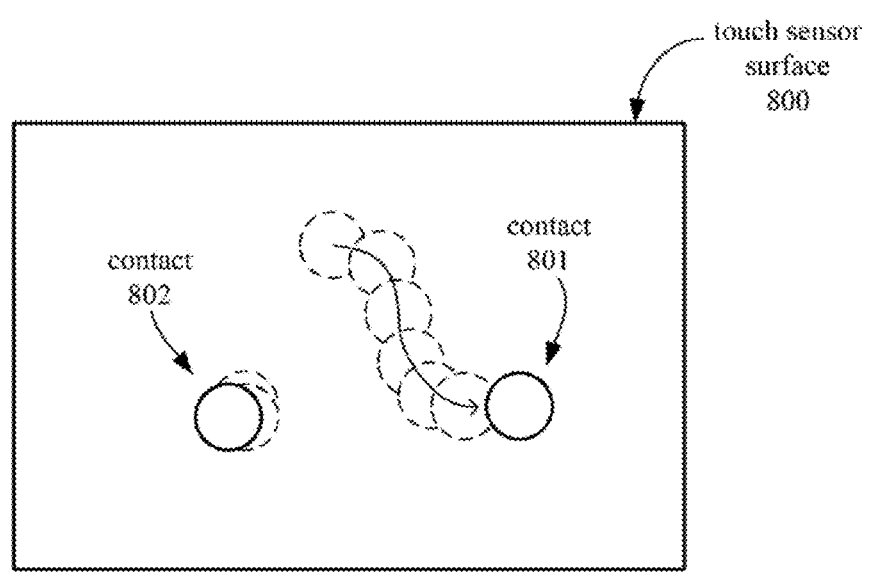
FIG. 8B illustrates possible locations of contacts performing a motion and tap gesture on a touch sensor surface, according to one embodiment.

FIG. 8B illustrates a surface of a touch sensor showing possible touch locations for contacts 801 and 802, including a path of contact 801 across the touch sensor surface 800, according to one embodiment.

At the initial touch by contact 801, contact 801 is recognized by the gesture recognition unit 102 and timer 804 is started. If contact 801 remains on the touch sensor surface 800 for longer than timer 804, the gesture recognition unit registers a touch by contact 801.

If the gesture recognition unit 102 detects a contact 802 more than a minimum distance away from contact 801, and the contact 802 occurs while the contact 801 is moving, the gesture recognition unit recognizes a motion and tap gesture. In one embodiment, the gesture recognition unit 102 determines whether the contact 801 is in motion by determining whether the distance between two locations of the contact 801 exceeds an active distance.

Figure 9:
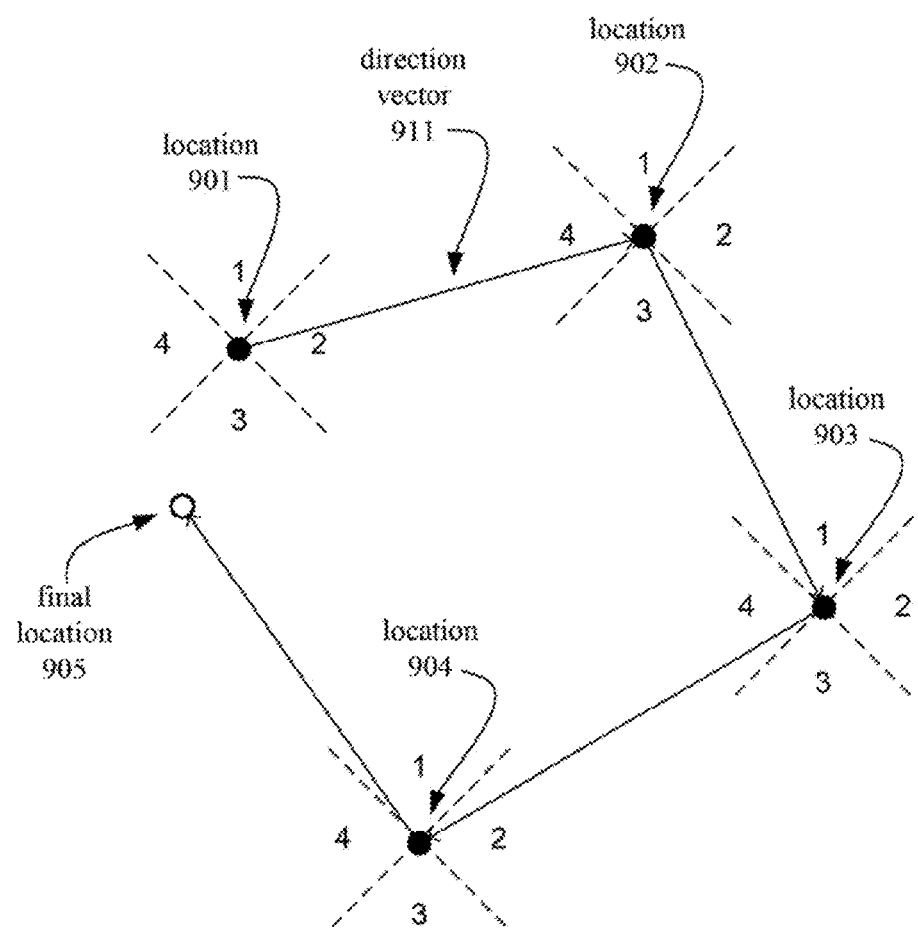
FIG. 9 illustrates a path of a contact performing a rotation gesture, according to one embodiment.

A single contact rotation gesture is one type of gesture that can be recognized based on a path of a contact. FIG. 9 illustrates a series of possible locations of a contact on a touch-sensing surface while the contact is performing a rotation gesture. These locations 901, 902, 903, 904, and 905 may be, for example, consecutively sampled locations of the contact over time as the contact moves across the surface of a touchpad or touchscreen.

In one embodiment, the direction of motion of the contact as it moves from one location to the next location is determined using a segmentation scheme as described above. The area around location 901, for instance, is divided into four segments. When moving from location 901 to location 902, the contact passes through segment 2, as indicated by the direction vector 911. Subsequent movements of the contact pass through segment 3, from location 902, segment 4, from location 903, and segment 1, from location 904.

Thus, the path from the initial location 901 to the final location 905 can be described in terms of the segments through which the contact passes. In this case, the sequence of segments would be {2, 3, 4, 1}.

In one embodiment, the gesture recognition unit 102 determines the sequence of segments associated with the path of the contact and compares the sequence to a sequence of segments associated with a particular gesture. In one embodiment, the gesture recognition unit 102 may store segment sequences for each of a number of possible gestures in a memory. The gesture recognition unit may access the memory to match the segment sequence associated with one of the gestures to the segment sequence of the input at the touch sensor.

With reference to FIG. 9, for example, if the detected segment sequence of the moving contact is {2, 3, 4, 1}, the gesture recognition unit, as part of the process of comparing detected input metrics with threshold values, may search for a gesture that is defined by the segment sequence {2, 3, 4, 1}. Upon finding a match, the gesture recognition unit 102 identifies the matching gesture as the gesture that has been performed at the touch sensor.

In the illustrated example, a rotation gesture, for which the path of the contact traces an approximate arc, may be defined by the segment sequence {2, 3, 4, 1}. The gesture recognition unit 102 matches this with the segment sequence derived from locations 901-905 and recognizes that a rotation gesture has been performed.

In one embodiment, the gestures are defined more broadly by patterns of segment sequences, rather than exact sequences. For example, a wider arc traced by a contact may result in a segment sequence of {2, 2, 2, 3, 3, 4, 4, 4, 1, 1}, which may still be recognized as a rotation gesture.

In one embodiment, path-based gestures may be used to change the orientation of objects or elements in a graphical user interface (GUI). For example, the rotation gesture may be used to rotate an object in the GUI. Path based gestures can also be assigned to any of a number of other functions, such as running scripts or programs, or closing windows.

A segmentation scheme can also be applied to multi-touch systems. In one embodiment of a multi-touch system, the segmentation scheme is applied independently to each moving contact to determine the direction in which each contact is moving. Multi-touch gestures may then be identified by matching the resulting sequences of segments with sequences defining the multi-touch gestures.

Figure 10:
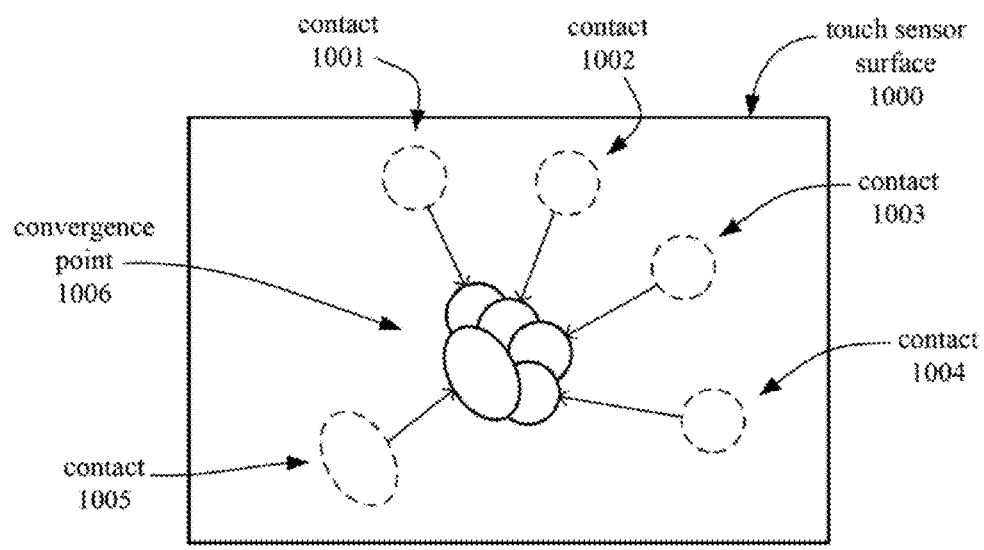
FIG. 10 illustrates possible locations of contacts performing a grab gesture on a touch sensor surface, according to one embodiment.

One type of multi-touch gesture that can be recognized based on directions or paths of multiple contacts is a grab gesture. FIG. 10 illustrates a surface of a touch sensor 1000 with possible locations and paths of contacts performing a grab gesture.

In one embodiment, a grab gesture is performed by initiating multiple contacts 1001, 1002, 1003, 1004, and 1005 on the touch sensor surface 1000, then moving each of the contacts towards a common convergence point 1006, while each of the contacts remains on the touch sensor surface 1000.

In one embodiment, the gesture recognition unit uses a segmentation scheme to track the movements of each of the multiple contacts 1001, 1002, 1003, 1004, and 1005 and recognizes a grab gesture when the resulting sequence of segments indicates that each of the contacts 1001, 1002, 1003, 1004, and 1005 are moving towards a convergence point 1006.

As an example, contact 1005 may be applied using a thumb, while contacts 1001, 1002, 1003, and 1004 may be applied using the remaining four fingers. In other embodiments, a grab gesture may be performed with fewer or more than five contacts.

Figure 11:
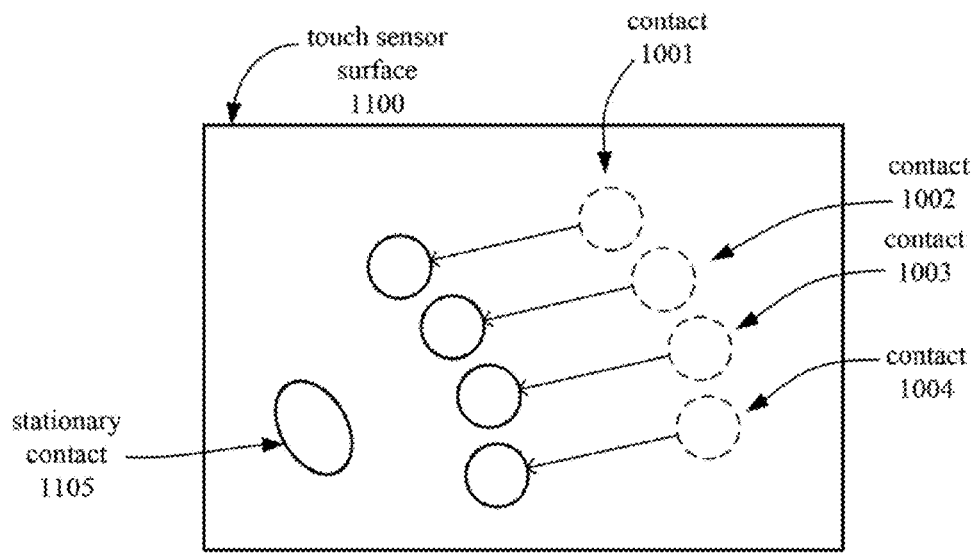
FIG. 11 illustrates possible locations of contacts performing a sweep gesture on a touch sensor surface, according to one embodiment.

Another type of multi-touch gesture that can be identified based on directions of multiple contacts is a sweep gesture. FIG. 11 illustrates a surface of a touch sensor 1100 with possible locations of contacts performing a sweep gesture.

In one embodiment, a sweep gesture may be performed by applying contacts 1001, 1002, 1003, 1004, and 1005 to the touch sensor surface 1000, then moving contacts 1001, 1002, 1003, and 1004 towards contact 1105 while contact 1005 remains substantially stationary.

In one embodiment, the gesture recognition unit 102 uses a segmentation scheme to determine the directions or paths of each of the moving contacts 1001, 1002, 1003, and 1004.

In one embodiment, the sweep gesture is recognized if the directions of the contacts 1001, 1002, 1003, and 1004 are proximally parallel and in a direction towards a stationary contact 1105. For example, if a segmentation scheme is used to determine the directions of the contacts 1001, 1002, 1003, and 1004, the sequences of segments for each of the contacts may be the same. For example, each of the contacts 1001, 1002, 1003, and 1004 may have the same sequence of segments {4, 4, 4, 4}. Alternatively, the sweep gesture may be recognized if the contacts 1001, 1002, 1003, and 1004, do not necessarily have the same segment sequence, but are moving towards a common convergence point that is also the location of the proximally stationary contact 1105.

In one embodiment, a sweep gesture may be recognized having fewer or more than four contacts moving towards the stationary contact 1105.

In one embodiment, a sweep gesture may be performed using a single moving contact and a single stationary contact. For example, an edge of a hand may make a single wide contact with a touch sensing surface and this single contact may be used to perform a sweep gesture towards a substantially stationary contact applied by a thumb or finger from a different hand.

Figure 12:
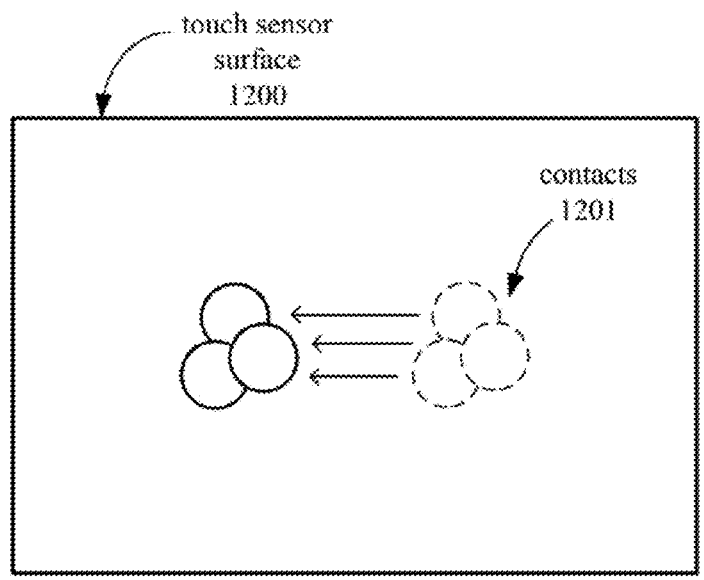
FIG. 12 illustrates possible locations of contacts performing a strum gesture on a touch sensor surface, according to one embodiment.

Another type of gesture having multiple contacts moving in the same direction is a strum gesture. A gesture recognition unit 102 may recognize a strum gesture upon detecting multiple contacts that are close together on a touch sensing surface and moving in the same direction. FIG. 12 illustrates a surface of a touch sensor 1200 with possible locations of contacts performing a strum gesture. In one embodiment, a strum gesture is performed by applying two or more contacts 1201 to the touch sensor surface 1200 and moving the contacts together in substantially the same direction.

In one embodiment, the gesture recognition unit 102 detects the beginning of a strum gesture when two or more contacts are applied to a touch sensor surface 1200. When the contacts are moved, the gesture recognition unit 102 may use a segmentation scheme to determine a direction of motion of the contacts.

The gesture recognition unit 102 recognizes the strum gesture upon detecting that the contacts have moved in substantially the same direction. When a segmentation scheme is used, the gesture recognition unit may compare the sequence of segments for each of the contacts to determine whether the contacts are moving along proximally parallel paths.

In one embodiment, the gesture recognition unit 102 only recognizes a strum gesture if the contacts 1201 are less than a maximum distance apart. For example, a strum gesture might be recognized only when the contacts are no more than 2 centimeters apart from each other.

In one embodiment, the gesture recognition unit 102 detects gestures based on a velocity or acceleration of a contact in motion. The gesture recognition unit may determine the acceleration of a contact, and recognize a gesture depending on whether the acceleration of the contact is within a predetermined range or exceeds a threshold acceleration.

In one embodiment, the gesture recognition unit determines the velocity or acceleration of a contact based on the distance between consecutive sampled locations of the contact. For example, when the location of the contact is sampled at regular intervals, the distance between the consecutive locations will increase over time if the contact is accelerating. Accordingly, the distance between consecutive locations of the contact will decrease if the contact is decelerating. This increase or decrease in the distance between consecutive contact locations can be used to determine an acceleration value for the contact.

Figure 13:
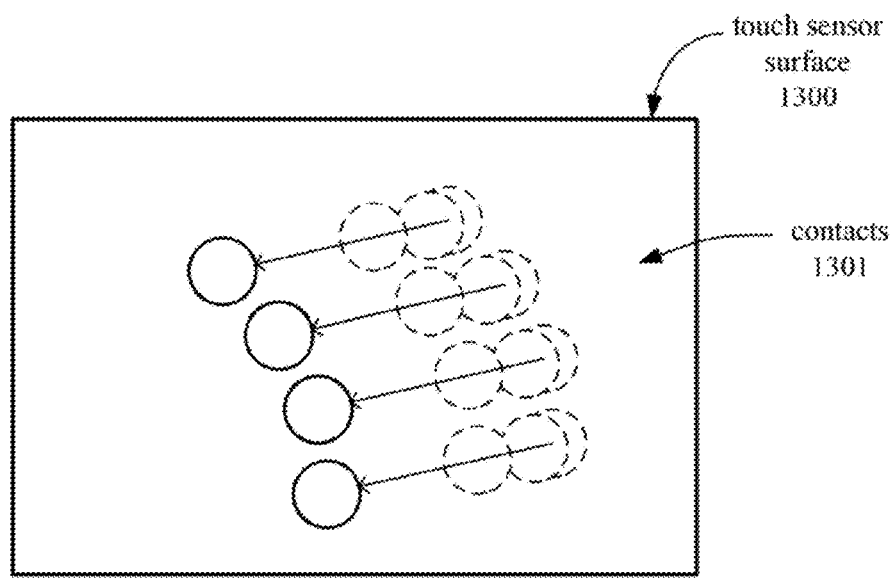
FIG. 13 illustrates possible locations of contacts performing a brush gesture on a touch sensor surface, according to one embodiment.

A brush gesture is one type of contact that can be recognized based on an acceleration of a contact. FIG. 13 illustrates a surface of a touch sensor 1300 with possible locations of contacts 1301 performing a brush gesture.

In one embodiment, a brush gesture is performed using four contacts 1301, which are moved in the same direction, with an accelerating or high velocity motion, across the touch sensor surface 1300.

For each of the contacts 1301, the gesture recognition unit 102 may determine whether each contact is in motion by determining whether the distance traveled by the contact has exceeded the active distance. In response to detecting that one or more contacts are in motion, the gesture recognition unit applies a segmentation scheme to determine whether the contacts in motion are following substantially parallel paths, or are moving in substantially the same direction. The gesture recognition unit 102 may also determine whether each contact is accelerating.

In one embodiment, the gesture recognition unit 102 only recognizes a brush gesture when the contacts 130 are all moving in substantially the same direction and at least one of the contacts 1301 is accelerating.

In an alternative embodiment, the number of contacts used to perform the brush gesture can be fewer or more than four. For example, one type of brush gesture may be recognized when one contact is moved across the touch sensor surface 1300 with an accelerating motion. In an alternate embodiment the brush gesture may be recognized when the contacts exceed a velocity threshold.

In one embodiment, the gesture recognition unit 102 performs a set of instructions associated with a gesture in response to detecting that the gesture has been performed at the touch sensor array 121. For example, an upwards gesture may be associated with an upwards scroll of a document on a display, or a leftward gesture may be associated with the "back" function in a web browser.

In one embodiment, a different set of instructions may be associated with a gesture depending on a location of the gesture, such as a start location or end location of one of the contacts in the gestures. Alternatively, the location can be calculated based on other features of the gesture, such as the location of a sharp angle in a path of the gesture, or the centroid of a bounding box of the gesture. Alternatively, the gesture may be interpreted differently depending on the specific location on the touch sensor surface, the specific operating context of the system, or the specific section of a display upon which a touchscreen recognizes the contacts.

For example, the same gesture may cause different instruction to be executed based on whether the gesture begins on the left or right halves of the touch sensor array. In another example, gestures may be performed on top of soft keys displayed on a touch screen, where a gesture beginning on one soft key causes a different set of instructions to be executed than the same gesture performed beginning on a different soft key.

Figure 14:
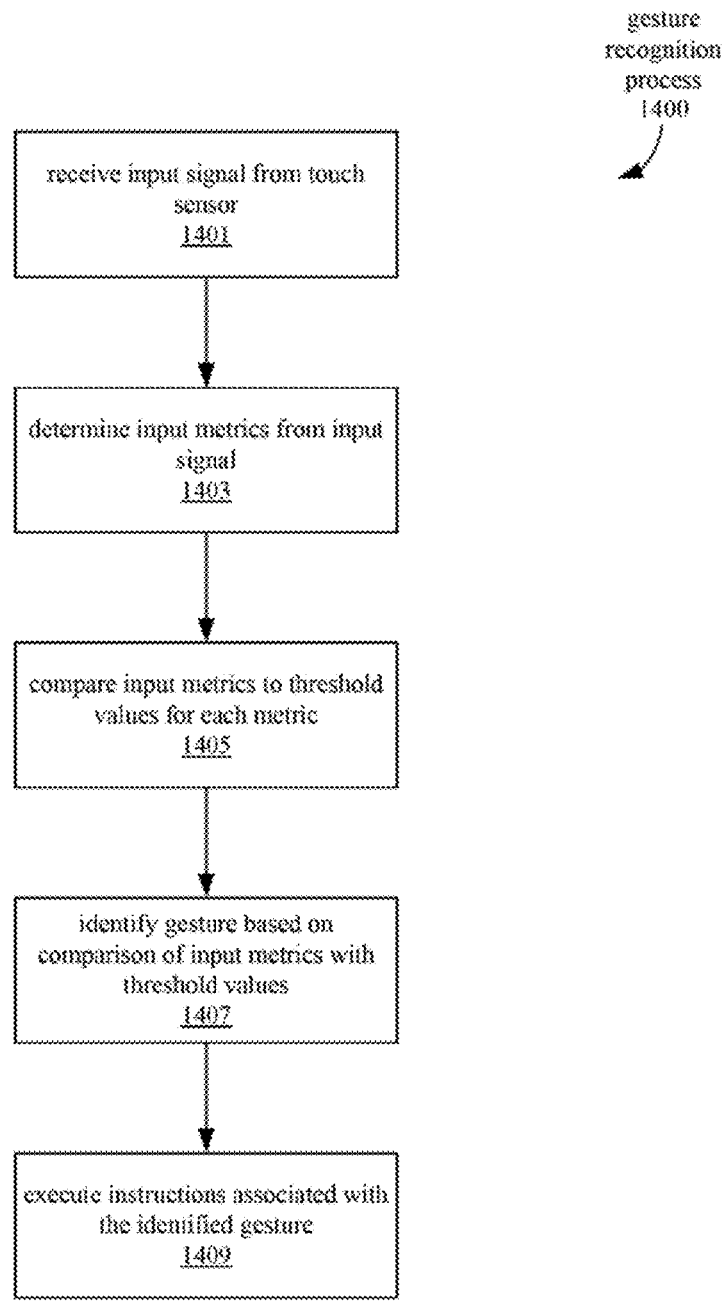
FIG. 14 is a block diagram illustrating a gesture recognition process, according to one embodiment.

FIG. 14 illustrates a process for recognizing a gesture, according to one embodiment. Gesture recognition process 1400 may be performed by a gesture recognition unit, such as gesture recognition unit 102.

At block 1401, the gesture recognition unit 102 receives an input signal from a touch sensor, such as touch sensor array 121. The input signal includes information about contacts at the touch sensor, such as the location and start and end times of each contact.

At block 1403, the gesture recognition unit 102 determines a set of input metrics from the input signal received at block 1401. For example, the gesture recognition unit 102 may calculate the durations and locations of each contact, distances between contacts, paths of each contact, durations of temporal overlaps of contacts, velocities of each contact, accelerations of each contact, or a number of contacts present at the touch sensor.

In one embodiment, the gesture recognition unit 102 determines whether a contact is in motion by determining whether the contact has moved by more than an active distance, e.g. a threshold distance.

In one embodiment, the gesture recognition unit 102 responds to detecting movement of a contact by determining the direction of motion of the contact. A gesture recognition unit may determine the direction of motion of a contact by using a segmentation scheme. For example, the gesture recognition unit may divide the area around a first location into segments which include a range of possible directions. The gesture recognition unit determines a direction vector from one location of the contact to a subsequent location of the contact, and identifies the segment through which the direction vector passes. For a series of consecutive locations of the contact, the gesture recognition unit generates a sequence of segments to describe the path of the contact.

At block 1405, the gesture recognition unit 102 compares the input metrics to threshold values for each input metric. These comparisons may include comparing the distance between contacts to a minimum or maximum distance, comparing a velocity of a contact to a threshold velocity or a range of velocities, comparing the acceleration of a moving contact to a threshold acceleration value or a range of acceleration values, comparing a segment sequence describing a path of a contact to a segment sequence defining a gesture, comparing a direction of motion of a contact to a range of directions, comparing a duration of a contact with a range of durations, or comparing a velocity of a contact in motion with a range of velocities.

At block 1407, the gesture recognition unit 102 identifies a gesture based on the comparison of input metrics with the threshold values of block 1405.

At block 1409, in response to identifying the gesture, gesture recognition unit 102 executes instructions associated with the identified gesture. For example, a particular gesture may be associated with a function such as, for example, moving objects in a GUI, playing sounds or displaying images, activating relays or other switches, or initiating transmissions of data.

Figure 15A:
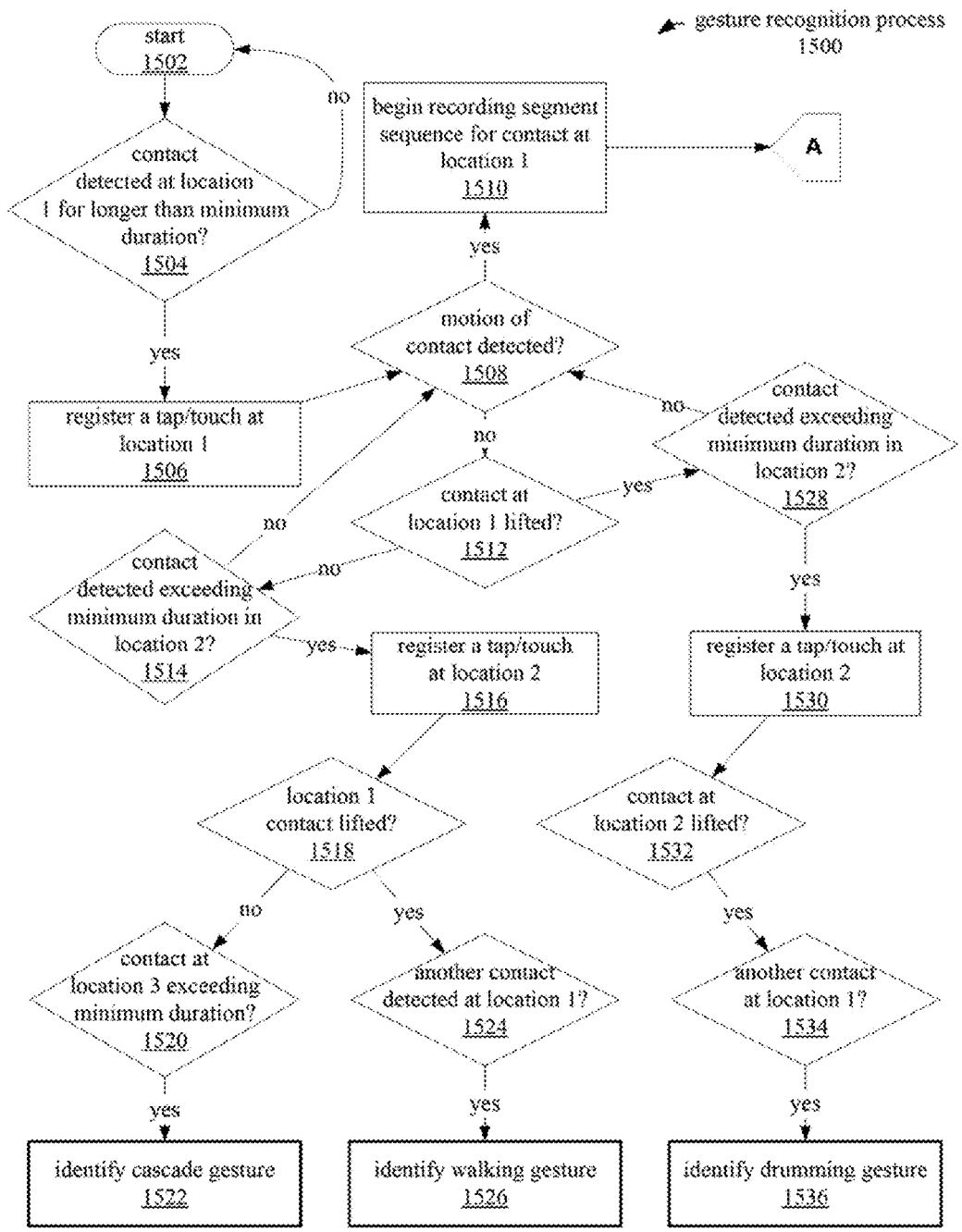
FIGS. 15A and 15B are block diagrams illustrating a gesture recognition process, according to one embodiment.
Figure 15B:
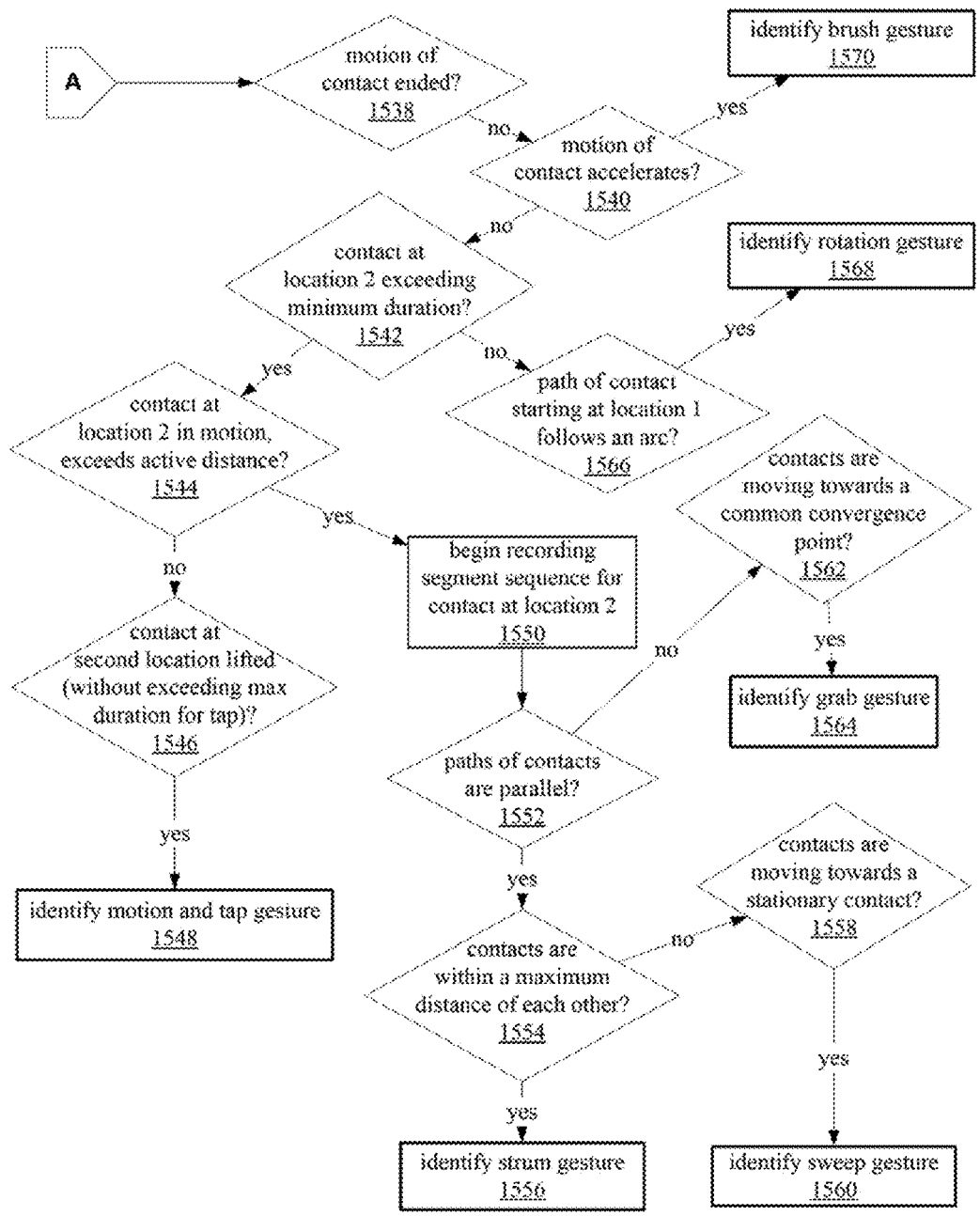

One embodiment of a gesture recognition process similar to gesture recognition process 1400 is described in detail with regard to FIGS. 15A and 15B. Gesture recognition process 1500 may be performed by a gesture recognition unit, such as gesture recognition unit 102.

Gesture recognition process 1500 begins at block 1502. Execution proceeds from block 1502 to block 1504, where the gesture recognition unit determines whether a contact has been detected at a first location (location 1) for longer than a minimum duration.

If a contact is not detected, the process 1500 loops back to the start block 1502. If a contact is detected and the duration of the contact exceeds the minimum duration for the contact to be recognized, the process 1500 continues at block 1506.

At block 1506, the gesture recognition unit registers the contact detected at block 1504 as a tap or touch. From block 1506, the process continues at block 1508.

At block 1508, the gesture recognition unit determines whether the contact is in motion. The gesture recognition unit may determine whether the contact is in motion based on whether or not the contact has moved a distance that is greater than an active distance in either the X or Y directions in a Cartesian coordinate system, or greater than a defined radius.

If the gesture recognition unit determines that the contact is in motion, the process 1500 continues at block 1510, where the gesture recognition unit begins processing to handle the motion of the contact. If the contact is not in motion, the process 1500 continues at block 1512.

At block 1512, the gesture recognition unit determines whether the contact at location 1 has been lifted. For example, a contact applied by a finger may be lifted off when the finger is removed from the touch sensing surface.

If the contact at location 1 has been lifted, the process 1500 continues at block 1528. If the contact has not been lifted, the process 1500 continues at block 1514.

At block 1514, the gesture recognition unit determines whether a contact has been detected at a second location (location 2), and whether the duration of the contact at the second location exceeds a minimum duration for the contact to be recognized as a tap or touch.

If no contact is detected that exceeds this minimum duration, the process 1500 returns to block 1508 to determine whether the contact is in motion. If the duration of the contact exceeds the minimum duration, process 1500 continues at block 1516.

At block 1516, the gesture recognition unit recognizes the contact at location 2 as a tap or touch. From block 1516, the process 1500 continues at block 1518.

At block 1518, the gesture recognition unit determines whether the contact at location 1 has been lifted. If the contact at location 1 has been lifted, the process 1500 continues at block 1524. If the contact at location 1 has not been lifted, the process 1500 continues at block 1520.

At block 1520, the gesture recognition unit determines whether a contact has been detected at a third location (location 3) that is different from locations 1 or 2. If a contact is detected at location 3 and the duration of the contact exceeds the minimum duration for a contact to be recognized as a tap or touch, the process 1500 continues to block 1522. If no contact is detected at location 3, the process 1500 loops back to block 1518 to determine again whether the contact at location 1 has been lifted.

At block 1522, the gesture recognition unit recognizes a cascade gesture. In one embodiment, the gesture recognition unit responds to identifying the cascade gesture by executing a set of instructions associated with the cascade gesture. In one embodiment, the cascade gesture may continue as long as the contacts at sequential locations are repeated, even when the locations of the contacts move. In one embodiment, a function performed or initiated by the gesture recognition unit in response to the cascade gesture may be based on the locations of the contacts of the cascade gesture. In an alternate embodiment, said function in response to the cascade gesture may be based on the positional order of detection of the contacts of the cascade gesture.

If, at block 1518, the contact at location 1 has been lifted, the process 1500 continues at block 1524, where the gesture recognition unit determines whether another contact is detected at location 1 after the first contact is lifted.

If the gesture recognition unit determines that this repeated contact at location 1 has been detected and exceeds the minimum duration for a contact to be recognized as a tap or touch, then process 1500 continues at block 1526.

If a repeated contact is not detected at location 1, the process 1500 does not recognize a gesture.

At block 1526, the gesture recognition unit recognizes a walk gesture. In one embodiment, the gesture recognition unit responds to identifying the walking gesture by executing a set of instructions associated with the walking gesture. In one embodiment, the walk gesture may continue as long as the contacts at alternating locations are repeated, even when the locations of the contacts move. In one embodiment, a function performed in response to the walk gesture may be based on the locations of the alternating contacts of the walk gesture.

If, at block 1512, the gesture recognition unit determines that the contact at location 1 has been lifted, the process 1500 continues at block 1528, where the gesture recognition unit determines whether a contact has been detected at a second location (location 2) different from location 1.

If the contact is not detected, process 1500 returns to block 1508 to determine whether the contact at location is in motion. If a contact is detected at location 2 and the duration of this contact exceeds the minimum duration for the contact to be recognized as a tap or touch, the process 1500 continues at block 1530.

At block 1530, the gesture recognition unit registers a tap or touch at location 2. From block 1530, the process 1500 continues at block 1532.

At block 1532, the gesture recognition unit determines whether the contact at location 2 has been lifted. For example, if the contact is applied by a finger touching a touch sensing surface, a lift-off of the contact may correspond to removal of the finger from the touch sensing surface.

In one embodiment, if the contact at location 2 is not lifted, the gesture recognition unit waits until the contact is lifted, or does not identify any gesture. If the contact at location 2 is lifted, the process 1500 continues to block 1534.

At block 1534, the gesture recognition unit determines whether another contact has been initiated at location 1. The gesture recognition unit may also determine whether the duration of this repeated contact at location 1 exceeds the minimum duration for the contact to be recognized as a tap or touch.

If no repeated contact is detected at location 1, the gesture recognition unit may, in one embodiment, wait for a predetermined time duration for such a contact to occur before restarting the gesture recognition process 1500. In one embodiment, the process 1500 proceeds to block 1536 if the gesture recognition unit detects a repeated contact at location 1 that is recognized as a tap or touch.

At block 1536, the gesture recognition unit identifies a drumming gesture. In one embodiment, the gesture recognition unit responds to identifying the drumming gesture by executing a set of instructions associated with the drumming gesture. In one embodiment, a function performed in response to the drumming gesture may be based on the locations of the alternating contacts of the drumming gesture.

At block 1508, if the gesture recognition unit determines that the contact at location 1 is in motion, the process 1500 continues at block 1510, where the gesture recognition unit begins recording a segment sequence for the contact at location 1. In one embodiment, the gesture recognition unit determines direction vectors between consecutively sampled locations of the contact, then records a sequence segments through which the respective direction vectors pass.

From block 1510, execution proceeds through off-page reference A to block 1538 in FIG. 15B. At block 1538, the gesture recognition unit determines whether the motion of the contact has ended.

In one embodiment, if the motion of the contact has ended, the gesture recognition unit does not recognize a gesture, but may instead recognize the motion of the contact as a drag operation. However, if the motion of the contact has not ended, the process continues at block 1540.

At block 1540, the gesture recognition unit determines whether the moving contact has accelerated. In one embodiment, the gesture recognition unit determines the acceleration of the contact by sampling locations of the contact at regular intervals and comparing distances between consecutively sampled locations of the contact. The gesture recognition unit compares the acceleration of the contact with a threshold acceleration value.

If the acceleration of the contact does not exceed the threshold acceleration value, the process 1500 continues at block 1542. If the acceleration of the contact exceeds the threshold acceleration value, the process 1500 continues at block 1570.

At block 1570, the gesture recognition unit identifies a brush gesture. In one embodiment, the gesture recognition unit responds to identifying the brush by executing a set of instructions associated with the brush gesture. In one embodiment, the brush gesture may be used to manipulate objects in a GUI, or may be used for navigating in a web browser or turning pages in a document. For example, a brush in one direction may correspond to the "back" function in a web browser, while a brush in another direction corresponds to the "forward" function. The brush gesture may also be used to implement functions such as "Page Up" or "Page Down", or for moving GUI windows or objects from one monitor to another.

If, at block 1540, the acceleration of the contact does not exceed the threshold acceleration value, process 1500 continues at block 1542, where the gesture recognition unit determines if there is a contact at a second location (location 2), different from location 1. The gesture recognition unit also determines whether the duration of the contact exceeds the minimum duration for the contact to be recognized as a tap or touch.

If no contact is recognized as a touch or tap at location 2, then process 1500 continues to block 1566. If the contact is detected at location 2 and the duration of the contact exceeds the minimum duration, the process 1500 continues at block 1544.

At block 1544, the gesture recognition unit determines whether the contact at location 2 that was detected at block 1542 is in motion. In one embodiment, the gesture recognition unit determines if the contact is in motion by comparing a distance between two locations of the contact with active distances in the X and Y directions.

If the movement of the contact exceeds one of the active distances, contact is recognized by the gesture recognition unit as being in motion, and the process 1500 continues to block 1550. If the movement of the contact does not exceed one of the active distances, the contact is not in motion, and the process 1500 continues at block 1546.

At block 1546, the gesture recognition unit determines whether the contact at the second location has been lifted before exceeding the maximum duration for a tap. For example, the maximum duration for a tap may be a time value such as 300 milliseconds. Accordingly, the gesture recognition unit would register the contact at location 2 as a tap, if the contact is lifted within 300 milliseconds of being initiated.

In one embodiment, if the contact at location 2 is not registered as a tap, the process 1500 returns to block 1544 to determine if the contact is in motion. Alternatively, the gesture recognition unit may restart the process 1500 without recognizing a gesture. If the contact at location 2 is registered as a tap, the process 1500 continues at block 1548.

At block 1548, the gesture recognition unit identifies a motion and tap gesture. In one embodiment, the gesture recognition unit responds to identifying the motion and tap gesture by executing a set of instructions associated with the motion and tap gesture. In one embodiment, a motion and tap gesture may be associated with a line drawing function, where a line with control points can be drawn in a GUI that corresponds to the path of the moving contact, while the taps indicate locations of control points of the line.

If, at block 1544, the gesture recognition unit determines that the contact is in motion, then process 1500 continues at block 1550, where the gesture recognition unit begins recording a sequence of segments describing the motion of the contact at location 2. From block 1550, process 1500 continues at block 1552.

At block 1552, the gesture recognition unit determines whether the paths of the first contact (starting from location 1) and the second contact (starting from location 2) are parallel.

For example, the gesture recognition unit may compare the sequences of segments describing the paths of each of the contacts to determine if the paths of the contacts are sufficiently parallel. The gesture recognition unit may consider two contacts to have parallel paths if their segment sequences are both $\{2, 3, 4, 1\}$, for example. In one embodiment, the comparison of segment sequences may also tolerate some degree of difference in the number of repeated segments or the order of segments. For example, a gesture recognition unit may consider $\{2, 2, 3, 3, 3, 4, 1\}$ as parallel to $\{2, 3, 4, 4, 1\}$. If the paths of the contacts are not parallel, the process 1500 continues at block 1562. If the paths of the contacts are parallel, the process 1500 continues at block 1554.

At block 1554, the gesture recognition unit determines whether the contacts are within a maximum distance of each other. This determination may be applied to multiple contacts. For example, if the maximum distance is 1 centimeter, the gesture recognition unit may determine whether each of the multiple contacts is within 1 centimeter of each of the other contacts.

In one embodiment, if any of the contacts is not within the maximum distance, the process 1500 continues at block 1558. If each of the contacts is within the maximum distance, the process 1500 continues at block 1556.

At block 1556, the gesture recognition unit identifies a strum gesture. In one embodiment, the gesture recognition unit responds to identifying a strum gesture by executing a set of instructions associated with the strum gesture. In one embodiment, a strum gesture can be used to simulate the motion of strumming a guitar. Alternatively, the strumming motion can also be used to manipulate objects in a GUI in conjunction with a grab gesture. For example, a user may use a grab gesture to select an object to move, then move the object using a strum gesture.

If, at block 1554, any of the contacts is not within the maximum distance, the process 1500 continues at block 1558, where the gesture recognition unit determines whether the contacts are moving towards a stationary contact.

In one embodiment, if the contacts are not moving towards a stationary contact, the gesture recognition may restart process 1500 without recognizing a gesture. Alternatively, the gesture recognition unit may wait until the stationary contact is initiated, or may instead recognize another gesture, such as a multiple-contact scroll gesture. If the contacts are moving towards a stationary contact, the process continues to block 1560.

At block 1560, the gesture recognition unit identifies a sweep gesture. In one embodiment, the gesture recognition unit executes a set of instructions for moving one or more GUI objects in response to identifying a sweep gesture. For example, the sweep gesture may allow a user to "sweep" a number of GUI icons to a particular area of a screen or display.

If, at block 1552, the paths of the contacts are not parallel, the process 1500 continues at block 1562, where the gesture recognition unit determines whether the contacts are moving towards a common convergence point. The gesture recognition unit may determine this based on the paths, as represented by segment sequences, of each of the contacts.

In one embodiment, if the contacts are not moving towards a common convergence point, the gesture recognition unit restarts process 1500 without recognizing a gesture. Alternatively, the gesture recognition unit may recognize some other gesture. If the contacts are moving towards a common convergence point, the process 1500 continues at block 1564.

At block 1564, the gesture recognition unit identifies a grab gesture. In one embodiment, the gesture recognition unit, in response to identifying a grab gesture, executes a set of instructions to allow a user to control the orientation or placement of an object in a GUI.

If, at block 1542, no contact is detected at a location 2 that exceeds the minimum duration required for the contact to be recognized as a touch or tap, the process 1500 continues at block 1566, where the gesture recognition unit determines if the path of the first contact (starting from location 1) follows an arc.

In one embodiment, the gesture recognition unit may compare a sequence of segments corresponding to the path of the contact with a sequence of segments corresponding to an arc or circle. For example, with reference to FIG. 9, such a segment sequence might be {2, 3, 4, 1}.

In one embodiment, if the path of the contact does not follow an arc, the gesture recognition unit restarts the process 1500 without recognizing a gesture. Alternatively, the gesture recognition unit may match the segment sequence of the moving contact with a segment sequence describing another path or shape. If the path of the contact follows an arc, the process 1500 continues at block 1568.

At block 1568, the gesture recognition unit recognizes a rotation gesture. In one embodiment, the gesture recognition unit executes instructions to cause an object to rotate or swivel in a GUI, in response to detecting the rotation gesture. The amount of the rotation may be correlated to the length of the arc traced by the contact, or to other features of the rotation gesture.

It is also noted that the assigned actions for the referenced gestures may be mapped to other functions. The specific mapping listed here is merely for example purposes. Any gesture that makes logical sense to the user can be defined by rules and recognized. However, the complexity of the software, firmware, or state machine that recognizes these gestures generally increases with the number of gestures that are recognized.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette, hard drive); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, or digital signals), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
processing an input signal using a segmentation scheme to determine a path of a contact, wherein the input signal indicates a location of the contact at a touch sensor;
determining a first direction vector between a first location of the contact and a second location of the contact;
selecting from a first plurality of segments a first segment associated with the first direction vector in response to determining that the direction of the first direction vector is within a range of directions associated with the first segment, wherein an area surrounding the first location is divided into the first plurality of segments, and wherein each of the first plurality of segments represents a range of directions around the first location of the contact;
determining a second direction vector between a second location of the contact and a third location of the contact;
selecting, from a second plurality of segments, a second segment associated with the second direction vector in response to determining that the direction of the second direction vector is within a range of directions associated with the second segment, wherein an area surrounding the second location is divided into the second plurality of segments, and wherein each of the second plurality of segments represents a range of directions around the second location of the contact; and identifying a gesture based on the path of the contact, wherein the path of the contact is represented by at least the first segment and the second segment.

2. The method of claim 1, further comprising comparing an active distance with a movement distance of the contact to determine whether the contact is in motion, wherein the movement distance is a distance between a first location of the contact and a second location of the contact.

3. The method of claim 1, wherein the path of the contact includes a sequence of segments.

4. The method of claim 1, wherein identifying the gesture based on the path of the contact comprises comparing a sequence of segments associated with the path to a sequence of segments associated with the gesture.

5. The method of claim 1, further comprising identifying a rotation gesture in response to determining that the path of the contact approximates an arc.

6. The method of claim 1, further comprising identifying a grab gesture in response to detecting that each of a plurality of contacts is moving towards a convergence point, wherein the input signal indicates a location of each of the plurality of contacts at the touch sensor.

7. The method of claim 1, further comprising identifying a sweep gesture in response to detecting simultaneous motion of each of a plurality of contacts, wherein the simultaneous motion of each of the plurality of contacts is substantially towards a location of a stationary contact, wherein the input signal indicates a location of each of the plurality of contacts at the touch sensor.

8. The method of claim 1, further comprising identifying a strum gesture in response to detecting simultaneous motion of each of a plurality of contacts, wherein the simultaneous motion is substantially in one direction, wherein each of the plurality of contacts is located within a threshold distance of each of the other contacts of the plurality of contacts, and wherein the input signal indicates a location of each of the plurality of contacts at the touch sensor.

9. The method of claim 1, further comprising executing a set of instructions in response to detecting a gesture, wherein the set of instructions is selected based on a location associated with the gesture.

10. An apparatus, comprising:
   an input configured to receive an input signal from a touch sensor, wherein the input signal indicates a location of a contact at the touch sensor;
   a gesture recognition unit coupled with the input, wherein the gesture recognition unit is configured to:
      apply a segmentation scheme to determine a path of the contact by dividing an area surrounding a first location of the contact into a first plurality of segments each representing a range of directions around the first location of the contact,
      determine a first direction vector between the first location of the contact and a second location of the contact,
      select from the first plurality of segments a first segment associated with the first direction vector by determining whether the first direction vector is within a range of directions defining the first segment,
      apply the segmentation scheme by dividing an area surrounding the second location of the contact into a second plurality of segments each representing a range of directions around the second location of the contact,
      determine a second direction vector between the second location of the contact and a third location of the contact,
      select from the second plurality of segments a second segment associated with the second direction vector by determining whether the second direction vector is within a range of directions defining the second segment, and
      identify a gesture based on the path of the contact, wherein the path of the contact is represented by at least the first segment and the second segment.

11. The apparatus of claim 10, wherein the gesture recognition unit is configured to identify the gesture based on the path of the contact by comparing a sequence of segments associated with the path to a sequence of segments associated with the gesture.

12. A method, comprising:
   determining, from an input signal, an amount of temporal overlap between a duration of a first contact and a duration of a second contact during which the first contact and the second contact are simultaneously present, wherein the input signal indicates a location of the first contact at a touch sensor and a location of the second contact at the touch sensor; and
   identifying a gesture based on comparing the temporal overlap with a threshold overlap value.

13. The method of claim 12, further comprising identifying a cascade gesture in response to detecting a threshold separation time between the start times of the plurality of contacts.

14. The method of claim 12, further comprising identifying a motion and tap gesture in response to detecting that a duration of the first contact temporally overlaps a duration of the second contact while the first contact is in motion.

15. The method of claim 12, further comprising detecting the first contact at a first location alternating with the second contact at a second location.

16. The method of claim 15, further comprising identifying a drumming gesture in response to detecting that the duration of the first contact is temporally non-overlapping with the duration of the second contact.

17. The method of claim 15, further comprising identifying a walking gesture in response to detecting that the duration of the first contact is temporally overlapping with the second contact.

18. The method of claim 12, further comprising executing a set of instructions in response to identifying the gesture, wherein the set of instructions is selected based on a location associated with at least one of the first contact and the second contact.

* * * * *